(12) United States Patent
Kato et al.

(10) Patent No.: US 7,840,324 B2
(45) Date of Patent: Nov. 23, 2010

(54) VEHICULAR SENSOR DEVICE AND VEHICULAR STABILIZING SYSTEM USING VEHICULAR SENSOR DEVICE

(75) Inventors: Kazuhiro Kato, Kariya (JP); Masahiko Taniguchi, Chiryu (JP); Masanobu Fukami, Hazu-Gun (JP)

(73) Assignee: Advics Co., Ltd., Aichi-pref. (JP)

( * ) Notice: Subject to any disclaimer, the term of this patent is extended or adjusted under 35 U.S.C. 154(b) by 689 days.

(21) Appl. No.: 11/794,157

(22) PCT Filed: Dec. 12, 2005

(86) PCT No.: PCT/JP2005/022760

§ 371 (c)(1), (2), (4) Date: Jun. 26, 2007

(87) PCT Pub. No.: WO2006/070589

PCT Pub. Date: Jul. 6, 2006

(65) Prior Publication Data

US 2008/0009994 A1 Jan. 10, 2008

(30) Foreign Application Priority Data

Dec. 27, 2004 (JP) ............................. 2004-376288
Oct. 12, 2005 (JP) ............................. 2005-297569

(51) Int. Cl.
*B62D 6/00* (2006.01)

(52) U.S. Cl. ........................ 701/41; 180/422; 180/443

(58) Field of Classification Search .................. 701/29, 701/41, 42; 180/422, 443, 444, 446
See application file for complete search history.

(56) References Cited

U.S. PATENT DOCUMENTS

| 5,034,580 | A | * | 7/1991 | Tada et al. | ............. | 200/61.45 R |
| 6,498,971 | B2 | * | 12/2002 | Leaphart | ...................... | 701/41 |
| 6,637,284 | B1 | * | 10/2003 | Gaeth | ......................... | 74/493 |
| 2001/0002623 | A1 | | 6/2001 | Tsunoda et al. | | |

(Continued)

FOREIGN PATENT DOCUMENTS

JP A-4-201762 7/1992

(Continued)

OTHER PUBLICATIONS

Office Action dated Feb. 20, 2009 in corresponding Chinese patent application No. 2005800439817 (and English translation).

(Continued)

*Primary Examiner*—Khoi Tran
*Assistant Examiner*—Stephen Holwerda
(74) *Attorney, Agent, or Firm*—Posz Law Group, PLC

(57) ABSTRACT

An object is to simplify the structure of electric wirings, and to facilitate installation. A vehicular motion quantity sensor and a steering angle sensor are installed in the same casing or mechanically connected directly with the casing. Therefore, it is possible to put together electrical wiring harnesses for transmitting the detection signals from the vehicular motion quantity sensor and the steering angle sensor to an ECU. Moreover, since all of the sensors can be located in the same compartment, the structure of the electrical wiring harnesses can be simplified and can be installed more easily.

6 Claims, 9 Drawing Sheets

U.S. PATENT DOCUMENTS

| | | | |
|---|---|---|---|
| 2001/0027913 A1* | 10/2001 | Sugata | 200/61.54 |
| 2002/0046937 A1 | 4/2002 | Matsumoto et al. | |
| 2004/0066091 A1* | 4/2004 | King | 307/10.1 |
| 2005/0119811 A1* | 6/2005 | Lim | 701/41 |

FOREIGN PATENT DOCUMENTS

| | | |
|---|---|---|
| JP | A-5-155326 | 6/1993 |
| JP | A-5-310116 | 11/1993 |
| JP | A-2000-65562 | 3/2000 |

OTHER PUBLICATIONS

Office Action dated Feb. 4, 2009 in corresponding Korean patent application No. 10-2007-7017191 (and English translation).

PCT International Search Report mailed on Jan. 17, 2006 for the corresponding International patent application No. PCT/JP2005/022760.

Office Action dated Aug. 29, 2008 in corresponding Chinese patent application No. 2005800439817 (and English translation).

* cited by examiner

VEHICULAR SENSOR DEVICE AND VEHICULAR STABILIZING SYSTEM USING VEHICULAR SENSOR DEVICE

FIELD OF THE INVENTION

The present invention relates to a vehicular sensor device and a vehicular stabilizing system using the vehicular sensor device, wherein the vehicular sensor device includes a combination of a vehicular motion quantity sensor and a steering angle sensor for detecting a steering angle of a wheel. The vehicular motion quantity sensor includes a driving dynamics sensor, such as a yaw rate sensor and a lateral acceleration sensor, for detecting a physical quantity.

BACKGROUND OF THE INVENTION

Conventionally, an ESC (Electronic Stability Control) system is known (for example, see Published Japanese translation No. 2004-506572 of a PCT international application) which executes a control for stabilizing a vehicle based on detection signals from a vehicular motion quantity sensor and a steering sensor, wherein vehicular motion quantity sensor includes a driving dynamics sensor, such as a yaw rate sensor and a lateral acceleration sensor. In this ESC system, the vehicular motion quantity sensor is located in an engine room of the vehicle, while the steering angle sensor is located at a place which is in the vicinity of a rotation axis of a steering and is in a passenger's compartment of the vehicle. In addition, the vehicular motion quantity sensor and a controller (ECU) of the ESC system are put together, and the steering angle sensor is connected with the ECU of the ESC system through electrical wiring harnesses. Thus, a detection signal from each sensor is inputted to the controller.

However, since the vehicular motion quantity sensor and the steering angle sensor are located separately, in the conventional way, wirings for connecting the vehicular motion quantity sensor with the ECU are installed to a place which is significantly different from a place to which wirings for connecting the steering angle sensor with the ECU are installed. In the case that the vehicular motion quantity sensor and the steering angle sensor are installed to different places, a structure for installation is required for each of the sensors. In addition, it is not easy to install the sensors since the sensors have to be installed individually. Because the wirings become intricate in their configuration and it becomes not easy to install the sensors, it takes a high cost to obtain the sensor device.

SUMMARY OF THE INVENTION

It is therefore an object to simplify the configuration of wirings and make it easier to install the sensors. In addition, it is an object to reduce effect of temperature and vibration on the vehicular sensor device. Moreover, it is an object to provide a vehicular stabilizing system using the vehicular sensor device.

In the present invention, a first aspect is that a vehicular motion quantity sensor is installed in a casing in which a steering angle sensor is installed, or that the vehicular motion quantity sensor is directly connected mechanically with the casing.

If, as described above, the vehicular motion quantity sensor is installed in the casing which houses the steering angle sensor, or is directly connected mechanically with the casing, it is possible to install wirings for connecting the vehicular motion quantity sensor with an ECU such as a controller and wiring for connecting the steering angle sensor and the ECU to the same place or places which are close to each other. Therefore, it is possible to put these wirings together. As a consequence, it is possible to simplify the configuration of wirings and to make it easier to install the sensors.

In this case, the vehicular motion quantity sensor (1a) and the steering angle sensor (1b) may be located in a passenger's compartment of the vehicle.

By installing the vehicular motion quantity sensor and the steering angle sensor in the passenger's compartment, it is possible to reduce effect of heat and vibration in an engine room on a detection signal of the vehicular motion quantity sensor.

In this case, the vehicular motion quantity sensor and the steering angle sensor may be installed to an interior of a steering column or in the vicinity of the steering column, wherein the steering column is for adjusting a tilt angle of a steering wheel (2b) by means of a tilt mechanism (2a) of a steering operation mechanism (2) for controlling the steering angle. More specifically, the vehicular motion quantity sensor and the steering angle sensor may be located in a combination switch device (2c) which houses a direction indicator attached to the steering operation mechanism.

The vehicular motion quantity sensor may be installed to a portion of the steering operation mechanism so that an orientation of the vehicular motion quantity sensor is kept unchanged at the portion irrespective of tilt angle adjustment executed by using the tilt mechanism.

It is possible to eliminate effect of the gravitational force corresponding to the tilt angle on the detection signal of the vehicular motion quantity sensor, by installing the vehicular motion quantity sensor to a portion of the steering operation mechanism so that an orientation of the vehicular motion quantity sensor is kept unchanged at the portion irrespective of tilt angle adjustment executed by the tilt mechanism.

In a second aspect, in the case that a vehicular stabilizing system includes the vehicular sensor device in which a quantity of a motion of the vehicle indicated by an output signal from the vehicular motion quantity sensor suffers from adjustment of tilt angle, the vehicular stabilizing system includes a controller (3) for receiving the detection signals from the vehicular motion quantity sensor and the steering angle sensor. The controller includes a tilt angle acquisition means (110) for obtaining a tilt angle caused by the steering operation mechanism and corrects, based on the tilt angle obtained by the tilt angle acquisition means, a quantity of motion of the vehicle, the quantity being indicated by an output signal from the vehicular motion quantity sensor.

Thus, it is possible to eliminate the effect of the gravitational force corresponding to the tilt angle by correcting the quantity of the motion of the vehicle obtained from the vehicular motion quantity sensor.

For example, in the case that the vehicular motion quantity sensor includes a longitudinal acceleration sensor for detecting, as a driving dynamics sensor, an acceleration in a longitudinal direction of the vehicle, the tilt angle acquisition means can obtain the tilt angle by using the acceleration in the longitudinal direction of the vehicle, the acceleration being determined by a detection signal outputted by the longitudinal acceleration sensor when a vehicle stop detection means detects that the vehicle is not moving.

The tilt angle acquisition means may obtain the tilt angle through an in-vehicle communication. In this case, the tilt angle acquisition means may, by means of a position information acquiring means, obtain from a tilt angle information storing means for relating and memorizing the tilt angle and position information of the steering column determined by the tilt mechanism, the position information through the in-vehicle communication. Then the tilt angle acquisition means can obtain indirectly the tilt angle corresponding to the position information from the tilt angle information storing means.

Each of the numbers which is between parentheses and is adjacent to one of the above means indicate correspondence between the means and a concrete means in embodiments described later.

BRIEF DESCRIPTION OF THE DRAWINGS

FIG. 3 is a schematic view showing adjustment of a tilt angle of a steering wheel 2 by means of a tilt mechanism 2a;

DETAILED DESCRIPTION OF THE EMBODIMENTS

First Embodiment

Figure 1:
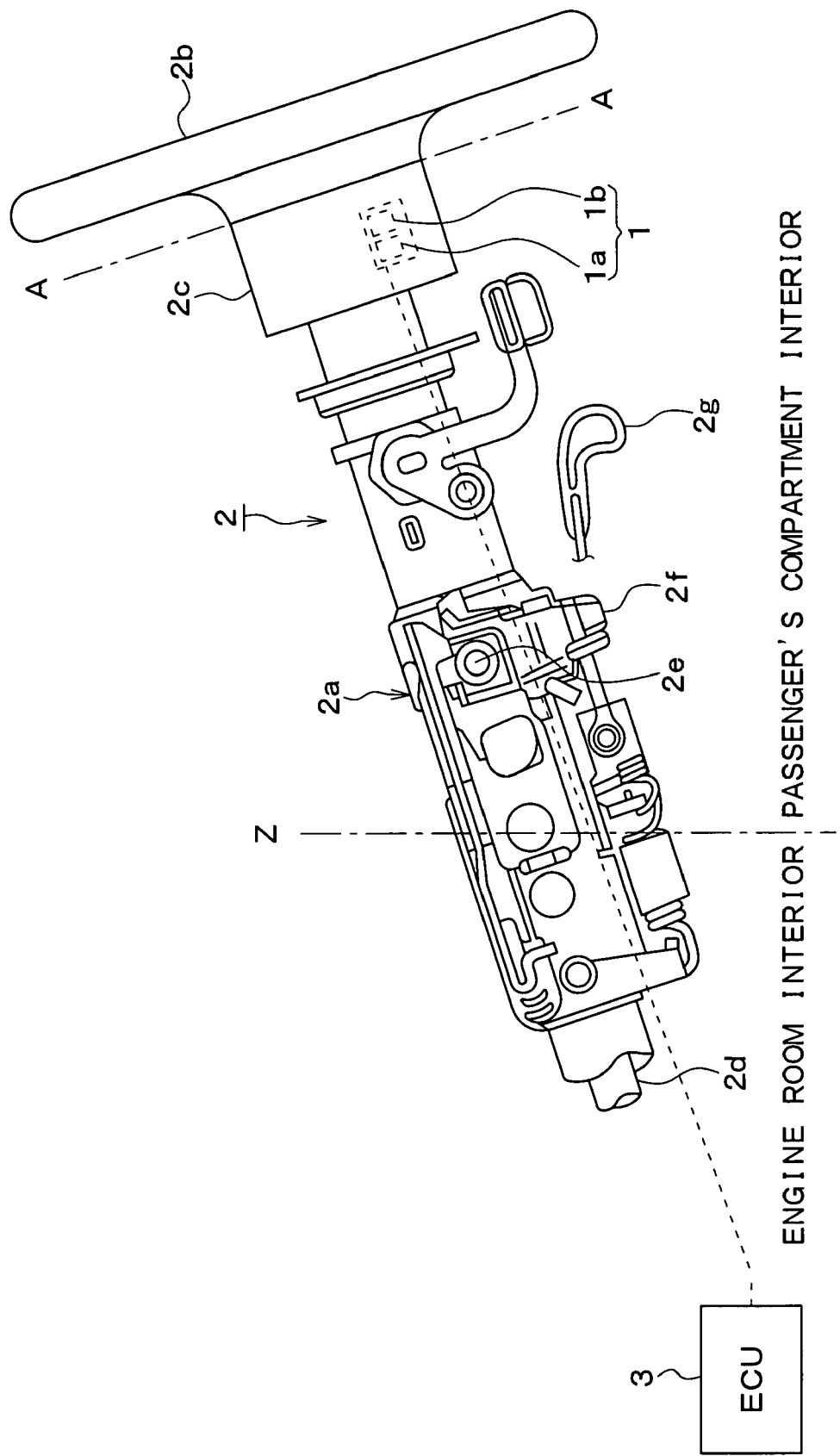
FIG. 1 is a diagram showing a steering operation mechanism 2 to which a vehicular sensor device 1 according to a first embodiment of the present invention is installed and an ECU 3 in an ESC system to which a detection signal from the vehicular sensor device 1 is inputted.
Figure 2:
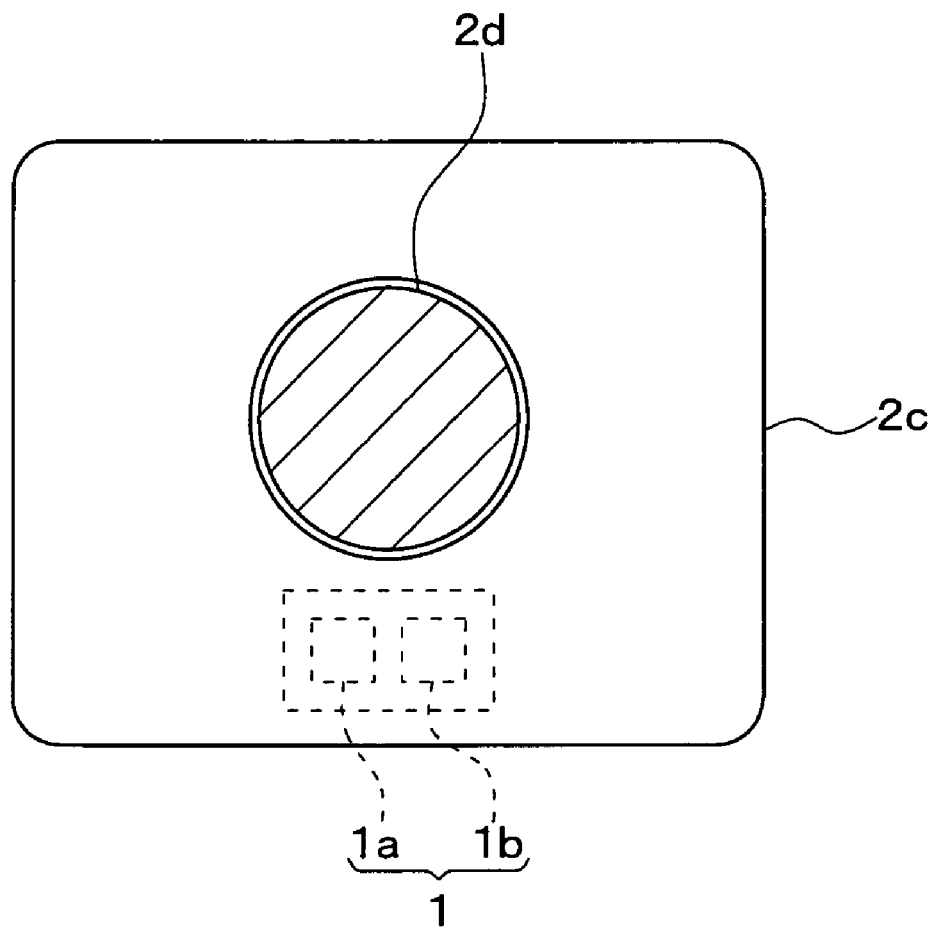
FIG. 2 is a schematic view showing a cross section taken along the A-A line in FIG. 1.

Hereinafter, a first embodiment of the present invention will be described. FIG. 1 shows a steering operation mechanism 2 to which a vehicular sensor device 1 according to the present embodiment is installed and also shows an ECU 3 in an ESC system to which a detection signal from the vehicular sensor device 1 is inputted. FIG. 2 is a schematic view of a cross section taken along the A-A line in FIG. 1. Hereinafter, an arrangement structure of the vehicular sensor device 1 will be described with reference to these figures.

The vehicular sensor device 1 according to the present embodiment includes a vehicular motion quantity sensor 1a and a steering angle sensor 1b. The vehicular motion quantity sensor 1a includes driving dynamics sensors such as a longitudinal acceleration sensor for detecting an acceleration (Gx) in the longitudinal direction of a vehicle, a lateral acceleration sensor for detecting an acceleration (Gy) in the lateral direction of the vehicle, and a yaw rate sensor for detecting a rotational angle around a gravity center of the vehicle. The vehicular sensor device 1, which has the vehicular motion quantity sensor 1a including the driving dynamics sensors and has the steering angle sensor 1b, is located in a tilt mechanism 2a (or a steering column) of the steering operation mechanism 2 or in the vicinity of the tilt mechanism 2a (or the steering column).

The steering operation mechanism 2 is for adjusting a steering angle for the front wheels (not shown) of the vehicle and has a structure in which a steering wheel 2b and a combination switch device 2c are attached to a steering shaft 2d. An operation of the steering wheel 2b causes the steering operation mechanism 2 to change the steering angle of the front wheel to an angle corresponding to the amount of the operation by transmitting a rotation corresponding to the amount of the operation through the steering shaft 2d to the a gear mechanism (not shown) and a link mechanism connected to the front wheels.

The steering operation mechanism 2 includes a tilt mechanism 2a. An inclination angle (i.e. tilt angle) of a center shaft of the steering wheel 2b can be adjusted to suit a body height of a driver by bending the steering shaft 2d by means of the tilt mechanism 2a.

Figure 3:
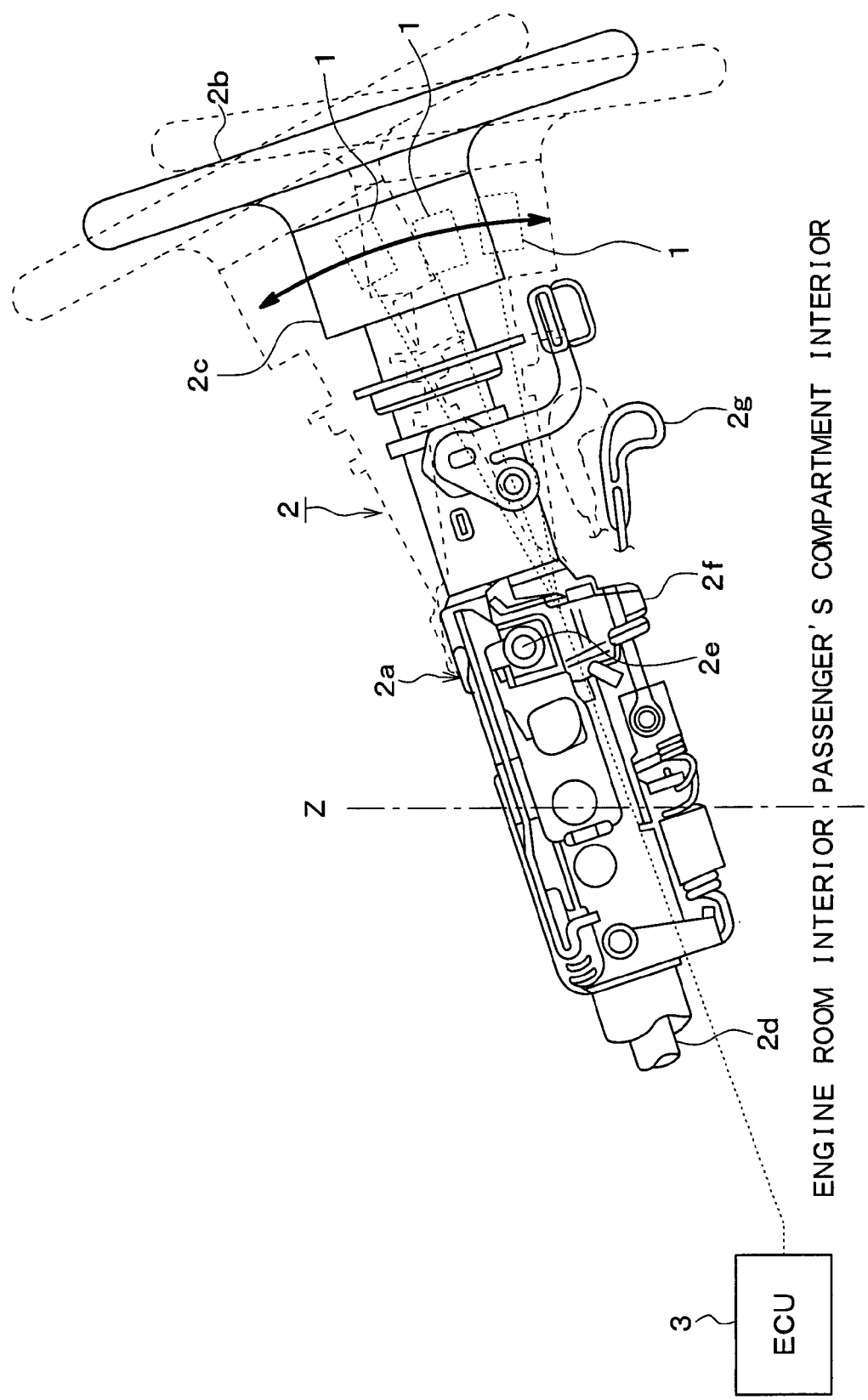

FIG. 3 shows a schematic view showing adjustment of a tilt angle of a steering wheel 2 by means of a tilt mechanism 2a. As shown in FIG. 2a, the tilt mechanism 2a has a mechanical structure for adjusting the tilt angle by using a bolt as a center of the tilt. More specifically, an adjustment lock device 2f is located under the bolt 2e for the steering shaft 2d and a lock/unlock state of the adjustment lock device 2f is controlled by operating a lever 2g. The tilt angle becomes adjustable when the lever 2g is operated and the adjustment lock device 2f is unlocked.

The combination switch device 2c located between the steering wheel 2b and tilt mechanism 2a is a unit including switch mechanisms such as a direction indicator switch and a wiper switch. In the present embodiment, the vehicular sensor device 1 having both of the vehicular motion quantity sensor 1a and steering angle sensor 1b is located in the combination switch device 2c. Therefore, the vehicular motion quantity sensor 1a and the steering angle sensor 1b are located in the same casing. In addition, as shown in FIG. 2, the vehicular sensor device 1 in the combination switch device 2c is located below the steering shaft 2d.

The passenger's compartment and the engine room of the vehicle are separated from each other at positions shown as an alternate long and short dash line Z. The combination switch device 2c is located in the passenger's compartment. Therefore, the vehicular sensor device 1, and accordingly vehicular motion quantity sensor 1a and steering wheel 2b, are located in the passenger's compartment.

The ECU 3 in the ESC system is located in the engine room and a detection signal from each of the sensors in the vehicular sensor device 1 is inputted into the ECU 3 through electrical wiring harnesses.

Figure 4A:
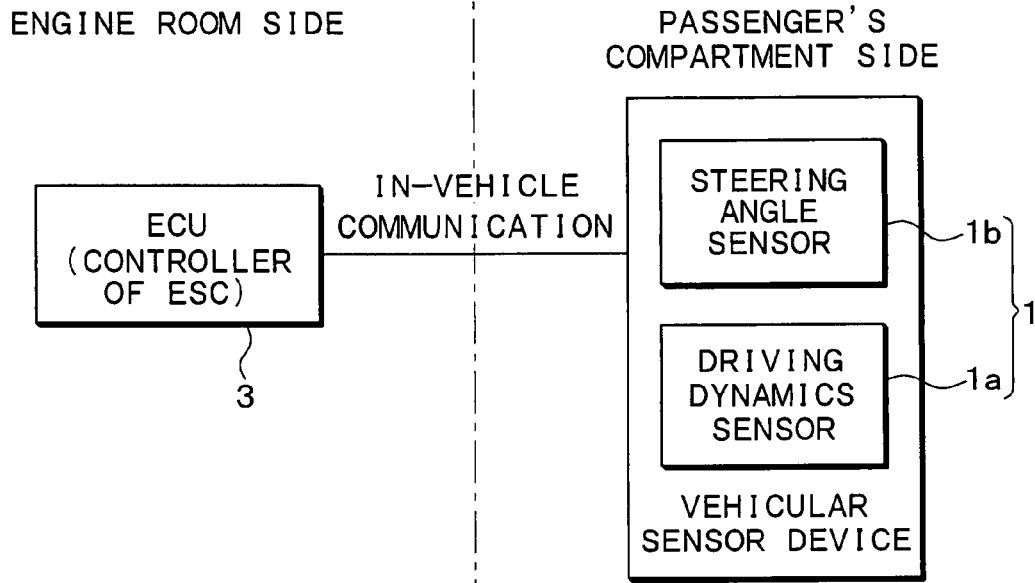
FIG. 4A is a block diagram showing a relation between positions of sensors and the ECU 3 in the vehicular sensor device 1 according to the first embodiment.
Figure 4B:
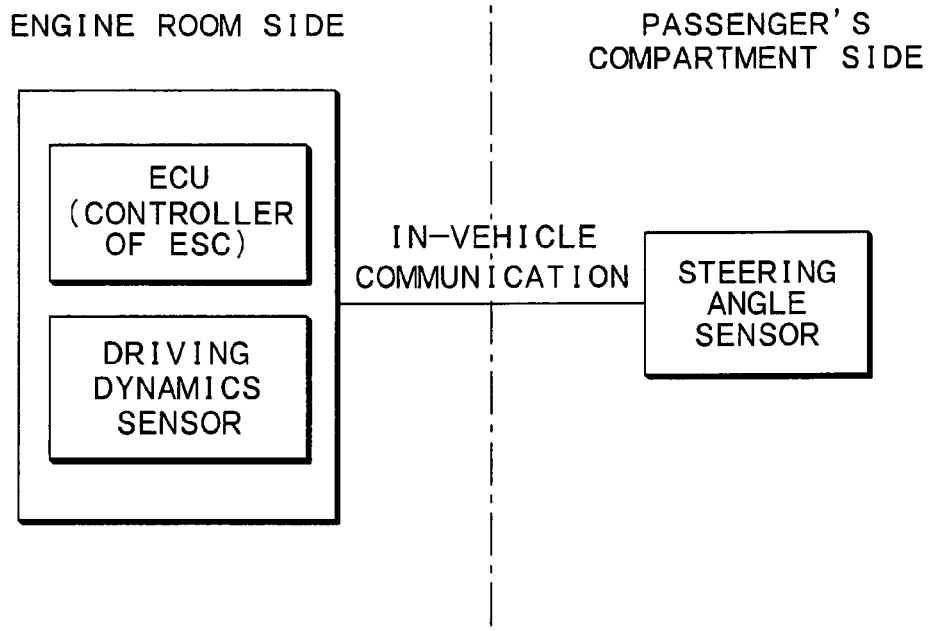
FIG. 4B is a block diagram showing a relation between positions of sensors and an ECU 3 in a conventional style.

Therefore, the vehicular sensor device 1 and the ECU 3 according to the present embodiment can be illustrated, as shown in FIG. 4A, as a block structure diagram in which ECU 3 is located in the engine room and the vehicular sensor device 1 is located in the passenger's compartment. In a conventional relation between a vehicular sensor device 1 and an ECU 3, the vehicular motion quantity sensor is located, as shown in FIG. 4B, in a place which is different from that of the present embodiment. More specifically, the ECU and the vehicular motion quantity sensor are located in the engine room and the steering angle sensor is located in the passenger's compartment.

The vehicular sensor device 1 described here is a part of the ESC system including the ECU 3. The ECU 3 executes an engine control and a brake control based on the detection signals from the vehicular sensor device 1 so that the vehicle is stabilized.

The vehicular sensor device 1 according to the present embodiment is constructed as described above. In addition, vehicular sensor device 1 having both the vehicular motion quantity sensor 1a and the steering angle sensor 1b is installed in the passenger's compartment. In other words, the vehicular motion quantity sensor 1a is located in the casing, namely the combination switch device 2c, which also includes the steering angle sensor 1b. Otherwise, the vehicular motion quantity sensor 1a is connected directly and mechanically with the casing, which includes the steering angle sensor 1b.

Therefore, the electrical wiring harnesses for transmitting the detection signals from the vehicular-motion quantity sensor 1a and steering angle sensor 1b to the ECU 3 can be put together. In addition, since all of the sensors can be located in the single casing, the structure of the electrical wiring harnesses can be simplified and can be installed more easily.

If the vehicular motion quantity sensor were located in the engine room, the sensor suffers significantly from temperature and vibration. Therefore, the engine room is not a suitable place for detecting an accurate motion quantity of the vehicle. By installing, as described above, the vehicular sensor device 1 including both of the vehicular motion quantity sensor 1a and the steering angle sensor 1b in the passenger's compartment, it is possible to decrease effect of the heat and vibration in the engine room on the detection signals from the vehicular motion quantity sensor 1a.

However, as described above, the steering operation mechanism 2 has a tilt mechanism 2a. Therefore, the orientation of the vehicular motion quantity sensor 1a changes depending on the adjustment of the tilt mechanism 2a. Therefore, the vehicular motion quantity sensor 1a suffers from the gravitational force and may fail to detect accurate motion quantities of the vehicle. For example, the longitudinal acceleration sensor would receive a detection signal which reflects the gravitational force.

In the present embodiment, the ECU 3 in the ESC system for stabilizing the vehicle based on the detection signal of the vehicular sensor device 1 executes a tilt correction process which will be described below.

Figure 5:
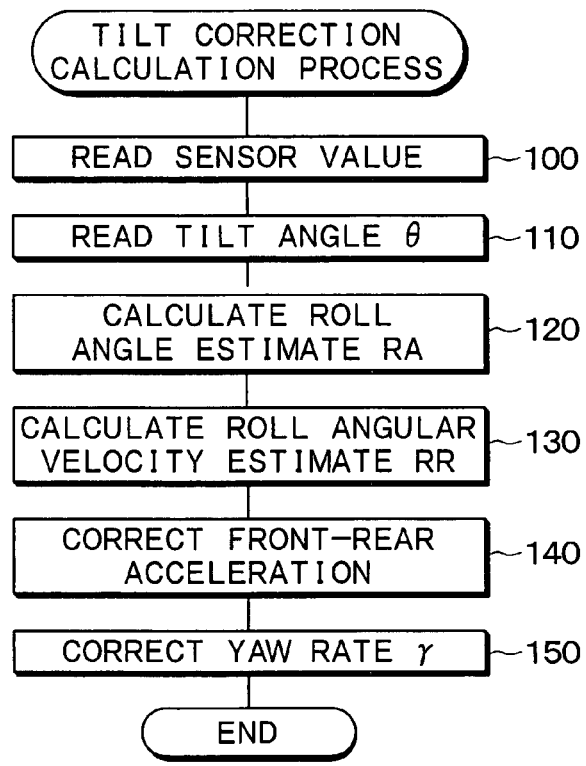
FIG. 5 is a flowchart showing a tilt correction process executed by the ECU 3 in the ESC system.

FIG. 5 is a flowchart showing the tilt correction process. The tilt correction process is executed at intervals of a calculation period. Each of physical quantities can be obtained correctly by executing the tilt correction process.

First, at step 100, sensor values are read. More specifically, the ECU 3 receives the detection signals from each of the driving dynamics sensors such as the longitudinal acceleration sensor, the lateral acceleration sensor, and the yaw rate sensor in the vehicular motion quantity sensor 1a which belongs to the vehicular sensor device 1. The ECU 3 then calculates the longitudinal acceleration Gx, the lateral acceleration Gy, and the yaw rate γ. In addition, the ECU 3 receives the detection signal from the steering angle sensor 1b and calculates the steering angle.

Subsequently at step 110, the tilt angle θ is read. A portion which belongs to the ECU 3 and executes this reading serves as a tilt angle acquisition means in the present invention. This reading of the tilt angle θ is executed as follows based on whether the vehicle has a function to memorize the tilt angle θ.

Some of vehicles which have the function to memorize the tilt angle θ lift up the steering wheel 2b to help the driver get out smoothly when the driver gets out. Those vehicles memorize the tilt angle θ as position information of the steering column when the driver sets the tilt angle θ. When the driver sits on the driver's seat again, the steering wheel 2b is automatically adjusted to achieve the desired tilt angle θ based on mapping information which indicates a relation between the memorized position information of the steering column and the tilt angle θ.

Therefore, it is possible to obtain information related to this tilt angle θ at intervals of the calculation period by using in-vehicle communication from a location (tilt angle information storing means) at which the position information of the steering column corresponding to this tilt angle θ is stored. Otherwise, it is possible to store the obtained information related to the tilt angle θ in the ECU 3 and obtain the tilt angle θ at intervals of the calculation period from the ECU 3. The information related to the tilt angle θ may be the tilt angle θ itself or the position information of the steering column.

As described above, in the vehicle having the function for memorizing the tilt angle θ, the tilt angle θ is retrieved from the place at which the tilt angle is θ stored. A portion which belongs to the ECU 3 and obtains the information related to the tilt angle serves as a tilt angle information acquisition means.

When the vehicle does not have the function to memorize the tilt angle θ, the vehicle may obtain a detection signal from a wheel rotation speed sensor by means of the in-vehicle communication and determine based on the detection signal whether vehicle is not moving or moving. If the vehicle is not moving, the tilt angle θ is estimated based on the longitudinal acceleration calculated at the step 100 described above and is stored in the ECU 3. After that, the tilt angle θ can be read at step 110 in calculation timings.

More specifically, in the case that the vehicle stops on a horizontal road, the longitudinal acceleration sensor outputs a detection signal indicating the tilt angle θ. Therefore, the detection signal indicates zero acceleration when the tilt angle θ is zero, since the longitudinal acceleration sensor does not detect the gravitation force. However, in the case that the tilt angle is θ is a certain angle, the longitudinal acceleration sensor detect a fraction of the gravitation force corresponding to the tilt angle θ.

Figure 6:
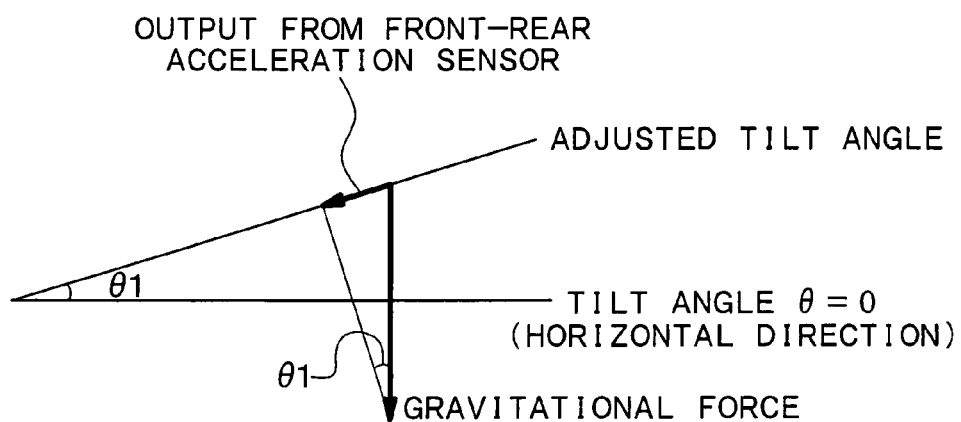
FIG. 6 is a diagram showing an effect on a detection signal of a longitudinal acceleration sensor caused by the tilt angle θ.

For example, as shown in FIG. 6 in which the tilt angle θ is zero in the horizontal direction, the detection signal from the longitudinal acceleration sensor indicates (the gravitational force)×sin θ1 when the tilt angle is equal to a certain angle θ1. Therefore, the tilt angle θ (the certain angle θ1) is calculated by using the following equation and the calculated value is stored as the tilt angle θ in the ECU 3.

tilt angle θ=sin$^{-1}$ (longitudinal acceleration/gravitational force)  (Equation 1)

Figure 7:
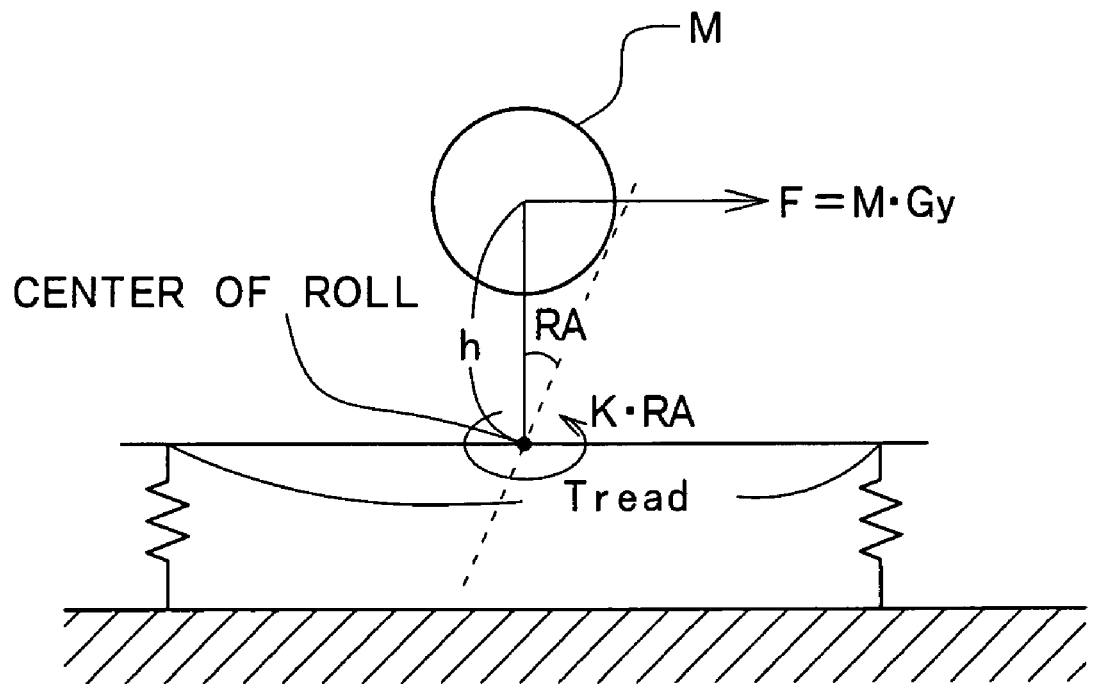
FIG. 7 is a schematic diagram showing a roll motion model in which a lateral acceleration is applied to a vehicle.

Subsequently at step 120, a roll angle estimate is calculated. The roll angle estimate is calculated based on the lateral acceleration calculated at step 100. For example, given that the roll angle estimate is RA and the lateral acceleration is G, the value RA is expressed as follows. The value K is a constant which is uniquely determined according to characteristics of the vehicle and is stored in the ECU 3 in advance. More specifically, the constant K is determined by taking the parameters in FIG. 7 showing a roll motion model into account. The parameters include, as shown in FIG. 7, a weight M of the vehicle on a spring, a roll stiffness k, a distance Tread between wheels, a distance h between the center of gravity of the vehicle and the center of roll, and a lateral acceleration Gy applied to the vehicle.

RA=K·(lateral acceleration)  (Equation 2)

Moreover, in step 130, a roll angular velocity estimate is calculated. The roll angular velocity estimate is obtained by filtering the time derivative of the roll angle estimate RA calculated at step 120 and is expressed by the following equation.

$$RR = \text{filter}(dRA/dt) \quad \text{(Equation 3)}$$

This filter is software filtering which the ECU 3 executes to filter noise which the time derivative of the roll angle estimate RA includes prominently. The filtered roll angular velocity estimate RR is the final result of the filtering.

Next, at step 140, the longitudinal acceleration correction is executed in order to eliminate effect of the tilt angle θ which is included in the longitudinal acceleration calculated at intervals of the calculation period. More specifically, the effect of the tilt angle θ is eliminated by using the tilt angle θ read at step 110 and executes correction indicated by the following equation.

$$Gx(\text{corrected value}) = Gx(\text{detected sensor value}) \cdot \cos\theta \quad \text{(Equation 4)}$$

At step 150, the yaw rate correction is executed in the similar manner. The yaw rate correction is executed in order to eliminate effect of the tilt angle θ which is included in the yaw rate γ calculated at intervals of the calculation period. More specifically, the effect of the tilt angle θ is eliminated by using the tilt angle θ read at step 110 and executes correction indicated by the following equation.

$$\gamma(\text{corrected value}) = 1/\cos\theta \cdot (\gamma(\text{detected sensor value}) - RR \cdot \sin\theta) \quad \text{(Equation 5)}$$

Thus, it is possible to obtain the longitudinal acceleration Gx and yaw rate γ in which the effect of the tilt angle θ is eliminated. It is therefore possible to properly stabilize the vehicle by causing ESC system to operate based on the longitudinal acceleration Gx and the yaw rate γ, which are free from the effect of the tilt angle θ, as well as the lateral acceleration Gy and the steering angle read at step 100.

As described above, in the present embodiment, the vehicular sensor device 1, which includes the vehicular motion quantity sensor 1a and steering angle sensor 1b are installed to the interior of the tilt mechanism 2a of the steering operation mechanism 2 or in the vicinity of the tilt mechanism 2a. Therefore, the vehicular motion quantity sensor 1a as well as the steering angle sensor 1b is located in the passenger's compartment, and only the ECU 3 is located in the engine room.

Therefore, it is possible to reduce effect of heat and vibration in the engine room on the detection signals from the vehicular motion quantity sensor 1a. In addition, it is possible to put together electrical wiring harnesses for transmitting the detection signals to the ECU 3, since both the vehicular motion quantity sensor 1a and the steering angle sensor 1b are located in the passenger's compartment. Moreover, since all of the sensors can be located in the passenger's compartment, the structure of the electrical wiring harnesses can be simplified and can be installed more easily.

Furthermore, the effect of the tilt angle θ on the longitudinal acceleration Gx and the yaw rate γ is eliminated in a logical manner. Therefore, the ESC can be executed without suffering the effect of the tilt angle even if the vehicular motion quantity sensor 1a is located in the tilt mechanism 2a or in the vicinity of the tilt mechanism 2a and the longitudinal acceleration Gx and the yaw rate γ include the effect of the tilt angle θ.

Therefore, it is possible to properly stabilize the vehicle based on the physical quantities which are free from the effect of the tilt angle θ.

Second Embodiment

Hereinafter, a second embodiment of the present invention will be described. In the first embodiment described above, the vehicular sensor device 1 is installed to the combination switch device 2c. In the present embodiment, the vehicular sensor device 1 is installed to a location which is different from that of the first embodiment.

Figure 8:
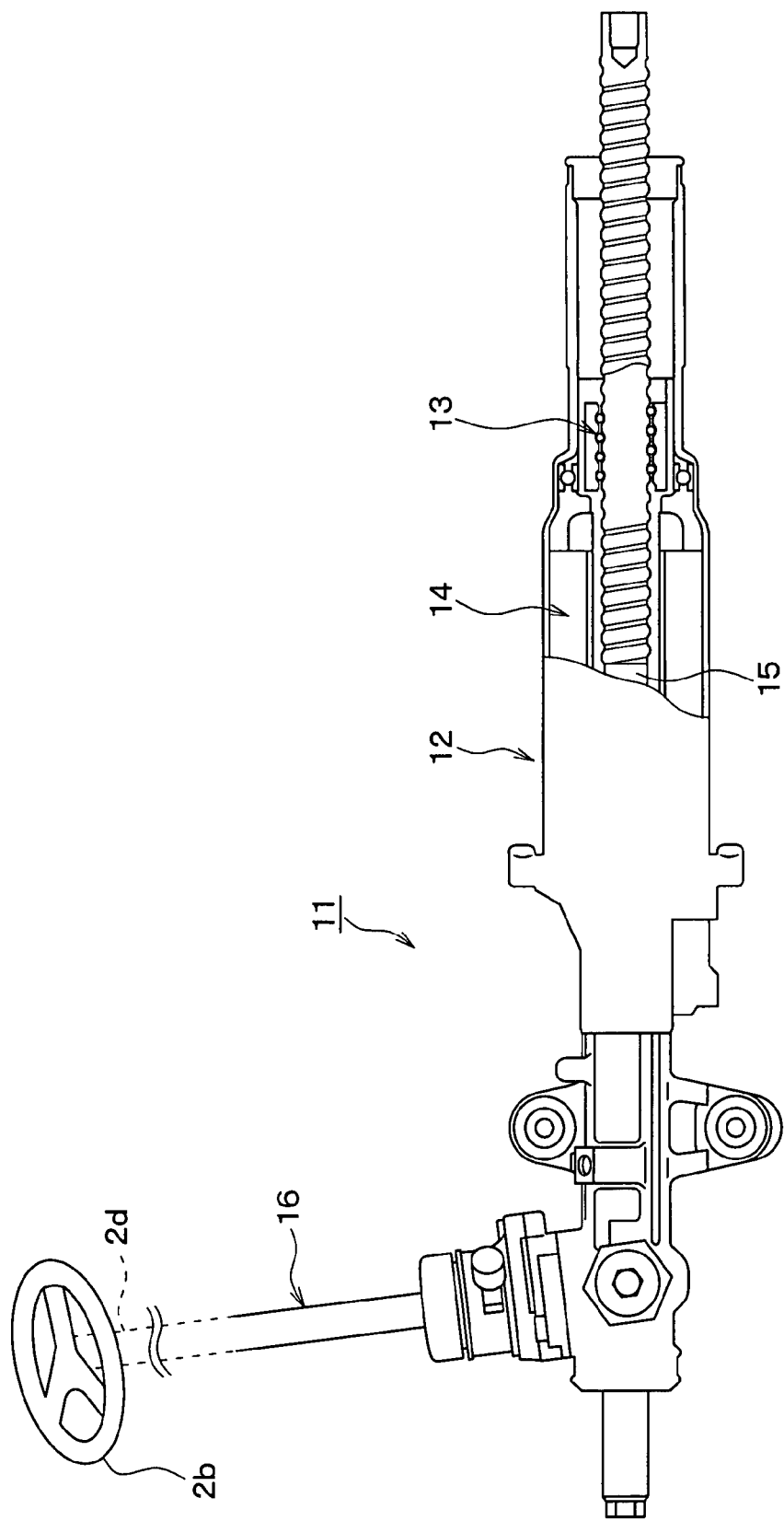
FIG. 8 is a schematic diagram showing a rack of a steering operation mechanism 2 to which a vehicular sensor device 1 according to a second embodiment of the present invention is installed.
Figure 9:
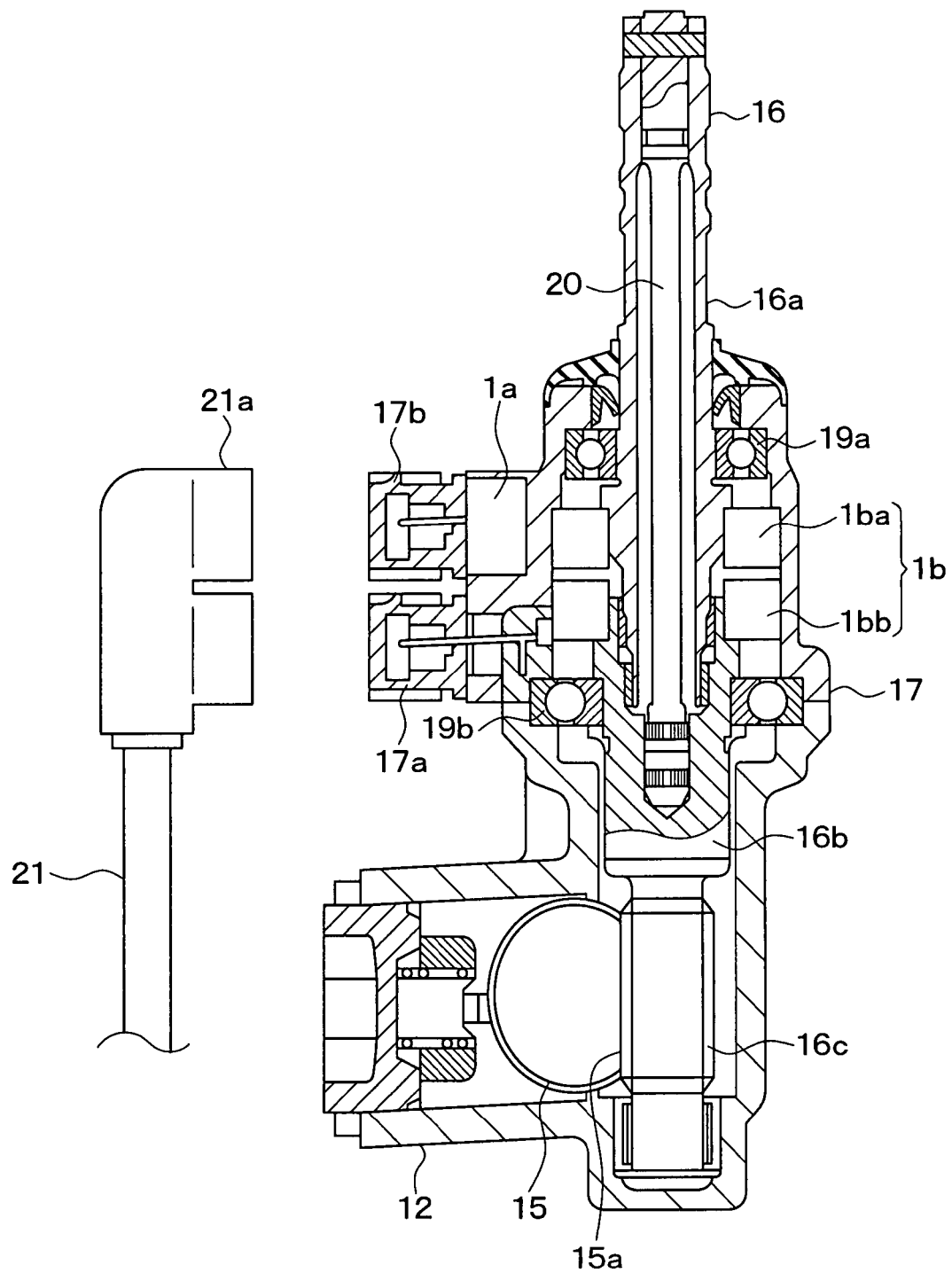
FIG. 9 is a cross-sectional view of a part of a rack in the power steering device shown in FIG. 8, wherein the vehicular sensor device 1 is attached to the rack.

FIG. 8 is a schematic view showing a power steering device to which the vehicular sensor device 1 is installed in the present embodiment. FIG. 9 is a cross-sectional view of a part of a rack in the power steering device shown in FIG. 8, wherein the vehicular sensor device 1 is attached to the rack.

The power steering device 11 shown in FIG. 8 is of a rack assist type and includes a rack assist mechanism 12 for assisting in back-and-forth motion of the rack by means of rotation of a motor.

The rack assist mechanism 12 includes a ball screw 13, an assist motor 14, and a rack shaft 15. When a pinion shaft 16 connected with the steering shaft 2d is rotated, the rotational force is transformed to a force for moving the rack shaft 15 in the axial direction of the rack shaft 15 and the assist motor 14 is rotated according to the rotation of the rack shaft 15 so as to assist in the rotation of the rack shaft 15. A torque sensor installed to the rack assist mechanism 12 serves as the steering angle sensor 1b.

As shown in FIG. 9, the pinion shaft 16 is inserted in a pinion housing 17 and supported by bearings 19a and 19b with its rotation allowed. The pinion shaft 16 includes an input axis 16a and an output axis 16b. A pinion gear 16c is located adjacent to the tip of the output axis 16b. Because a cog portion of the pinion gear 16c and a mesh portion 15a of the rack shaft 15 mesh, the rotation of the pinion shaft 16 is transformed to a force for moving the rack shaft 15 in its axial direction.

A torsion bar 20 is inserted in the input axis 16a and the output axis 16b of the pinion shaft 16 and the axes 16a and 16b are connected through the torsion bar 20 so that the input axis 16a and output axis 16b are rotated as a single body. One of the ends of the torsion bar 20 closer to the input axis 16a of the pinion shaft 16 is connected with the input axis 16a through a pin or the like. One of the ends of the torsion bar 20 closer to the output axis 16b of the pinion shaft 16 is splined to the output axis 16b. The torsion bar 20 generates an elastic force for twisting the input axis 16a and the output axis 16b when the input axis 16a and the output axis 16b are rotated with different rotational speeds.

The steering angle sensor 1b serving as the torque sensor is located at the radially outer side of the input axis 16a and the output axis 16b. The steering angle sensor 1b includes a first resolver 1ba and a second resolver 1bb. A relative difference of rotational angles of the input axis 16a and output axis 16b, which is equivalent to a torsion angle of the torsion bar 20, is obtained by detecting the rotational angles of the output axis 16b and the output axis 16b. Then, the steering torque is calculated based on the stiffness of the torsion bar 20. Since the steering torque is a physical quantity corresponding to the steering angle, the torque sensor functions as the steering angle sensor 1b.

The vehicular motion quantity sensor 1a is also fixed to the pinion housing 17. A connector 17a and a connector 17b are installed to a side face portion of the pinion housing 17, wherein the connector 17a is for establishing electrical connection with the first resolver 1ba and the second resolver 1bb and the connector 17b is for establishing electrical connection with the vehicular motion quantity sensor 1a. A connector 21a of a cable 21 can be connected with the connectors 17a and 17b, wherein electrical wirings for connecting vehicular motion quantity sensor 1a with the ECU 3 and electrical wirings for connecting steering angle sensor 1b with the ECU 3 are put together in the cable 21.

As described above, the vehicular sensor device 1 including the vehicular motion quantity sensor 1a and the steering angle sensor 1b are installed to the pinion housing 17. Therefore, electrical wirings for inputting the detection signal from the vehicular motion quantity sensor 1a and the steering angle sensor 1b into the ECU 3 can be put together. In addition, since all of the sensors can be located in the same casing, the structure of the electrical wiring harnesses can be simplified and can be installed more easily.

Other Embodiments

In the above embodiments, the vehicular sensor device 1 is located at the interior of the tilt mechanism 2a or in the vicinity of the tilt mechanism 2a, so that the effect of the tilt angle θ on the vehicular motion quantity sensor 1a is eliminated. However, the vehicular motion quantity sensor 1a can be located in a manner so that the vehicular motion quantity sensor 1a does not suffer from the effect of the tilt angle.

For example, the vehicular motion quantity sensor 1a may be located to a portion of the tilt mechanism 2a where the tilt angle θ does not change caused by tilt adjustment, not to a portion (steering side) of the tilt mechanism 2a where the tilt angle θ changes caused by the tilt adjustment. In this case, it is still necessary that the vehicular motion quantity sensor 1a is located in the passenger's compartment in order to reduce the effect of the heat and the vibration in the engine room on the vehicular motion quantity sensor 1a, to simplify the structure of electric wirings, and to facilitate installation of the electric wirings.

Figure 10:
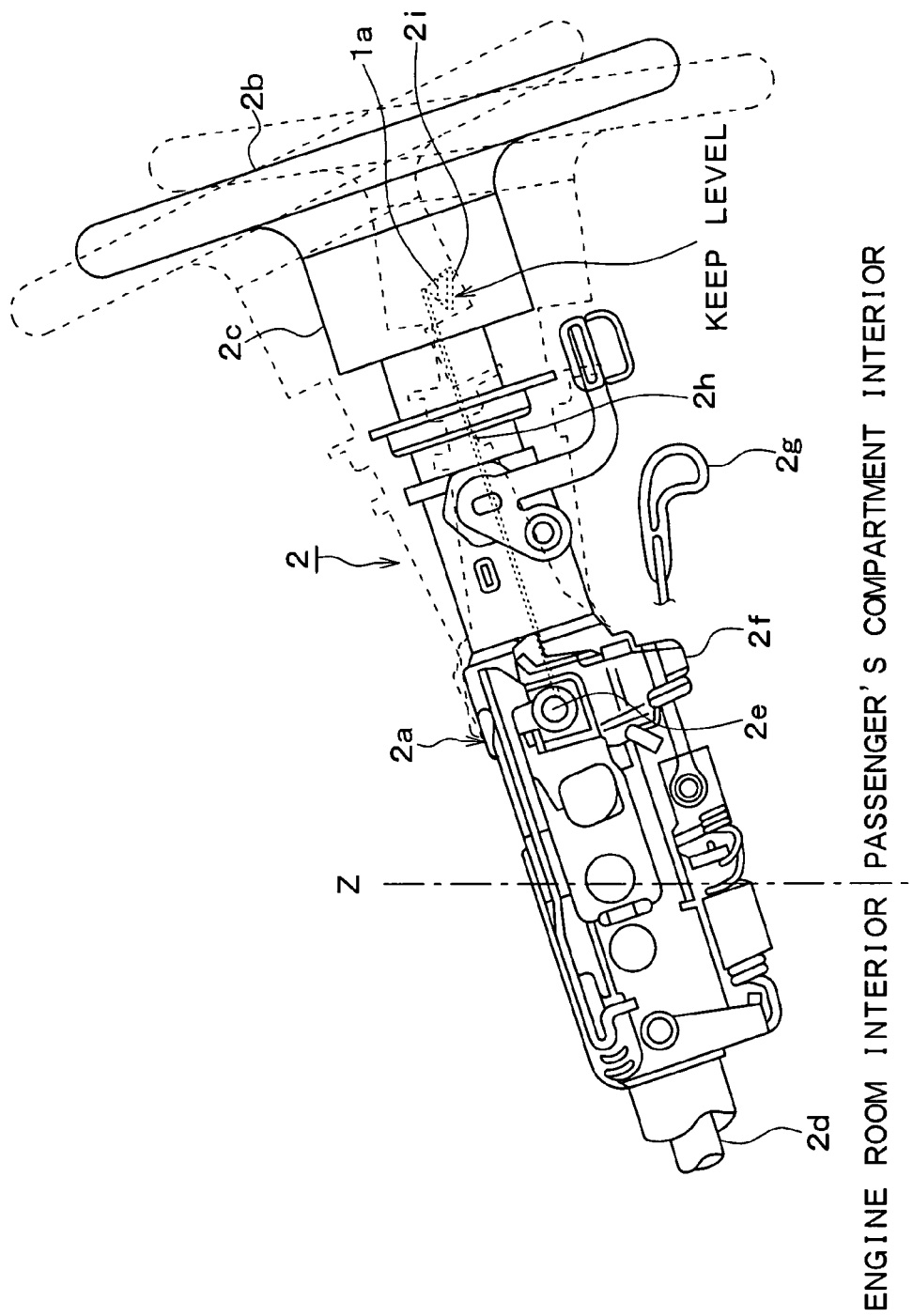
FIG. 10 is a schematic diagram showing a steering operation mechanism 2 to which a vehicular sensor device 1 according to another embodiment of the present invention.

As shown in FIG. 10, even if the vehicular motion quantity sensor 1a is located at a portion where its tilt angle θ changes caused by the tilt adjustment, it is not necessary to take the effect of the tilt angle θ into account if the vehicular motion quantity sensor 1a is installed to a mounting 2i attached to a stay 2h extending along the steering shaft 2d wherein the orientation of the mounting 2i is kept unchanged and horizontal when the tilt angle θ is changed by the tilt adjustment. For example, while the tilt adjustment of the steering wheel 2b is being executed, the mounting 2i becomes free from the tilt adjustment and is accordingly kept horizontal. When the tilt adjustment is finished and the steering wheel 2b is locked, the mounting 2i is immobilized as well.

In the above embodiment, the vehicular motion quantity sensor 1a includes the longitudinal acceleration sensor, the lateral acceleration sensor, and a yaw rate sensor. However, the present invention can be applied to a vehicular sensor device 1 which has a vehicular motion quantity sensor 1a having at least one of them. In addition, the same thing can be said for an up-down acceleration sensor, a roll rate sensor, and a pitch rate sensor. The present invention can be applied to the vehicular sensor device 1 which has a vehicular motion quantity sensor 1 a having at least one of them.

In addition, in the second embodiment, the vehicular sensor device 1 is installed to the power steering device of the rack assist type. However, the present invention can be applied to the power steering devices of other types such as a pinion assist type and column assist type. In the power steering devices of the pinion assist type and the column assist type, location of a torque sensor serving as the vehicular motion quantity sensor 1a is determined. By installing the vehicular motion quantity sensor 1a to the determined location, it is possible to achieve the advantage of the second embodiment.

The steps shown in the figures correspond to means for executing several kinds of processes.

What is claimed is:

1. A vehicular stabilizing system comprising:
   a sensor device that includes:
      a vehicular motion quantity sensor including at least one driving dynamics sensor; and
      a steering angle sensor for detecting a steering angle of a vehicle; and
   a controller for receiving the detection signals from the vehicular motion quantity sensor and the steering angle sensor, wherein
   the vehicular motion quantity sensor is installed in a casing in which the steering angle sensor is installed or the vehicular motion quantity sensor is directly connected mechanically with the casing,
   the vehicular motion quantity sensor and the steering angle sensor are located at an interior of a steering column or in the vicinity of the steering column,
   the steering column is for adjusting a tilt angle of a steering wheel by a tilt mechanism of a steering operation mechanism for controlling the steering angle,
   the vehicular stabilizing system stabilizes the vehicle based on detection signals from the vehicular motion quantity sensor and the steering angle sensor of the sensor device, and
   the controller includes a tilt angle acquisition means for obtaining a tilt angle caused by the steering operation mechanism and corrects, based on the tilt angle obtained by the tilt angle acquisition means, a quantity of motion of the vehicle, the quantity being indicated by an output signal from the vehicular motion quantity sensor.

2. The vehicular sensor device according to claim 1, wherein the vehicular motion quantity sensor and the steering angle sensor are located in a passenger's compartment of the vehicle.

3. The vehicular sensor device according to claim 1, wherein the vehicular motion quantity sensor and the steering angle sensor are located in a combination switch device, which houses a direction indicator attached to the steering operation mechanism.

4. The vehicular stabilizing system according to claim 1, wherein:
   the vehicular motion quantity sensor includes a longitudinal acceleration sensor for detecting, as a driving dynamics sensor, an acceleration in a longitudinal direction of the vehicle; and
   the tilt angle acquisition means includes a vehicle stop detection means for detecting that the vehicle is not moving and obtains the tilt angle by using the acceleration in the longitudinal direction of the vehicle, the acceleration being determined by a detection signal outputted by the longitudinal acceleration sensor when the vehicle stop detection means detects that the vehicle is not moving.

5. The vehicular stabilizing system according to claim 1, wherein the tilt angle acquisition means obtains the tilt angle through an in-vehicle communication.

6. The vehicular stabilizing system according to claim 5, wherein the tilt angle acquisition means:
   includes a tilt angle information acquisition means for obtaining information related to the tilt angle through the in-vehicle communication from a tilt angle information storing means for relating and memorizing the tilt angle and position information of the steering column determined by the tilt mechanism; and
   obtains indirectly the tilt angle by obtaining the information related to the tilt angle by using the tilt angle information acquisition means.

* * * * *